Feb. 13, 1940.   B. C. BARTLEBAUGH   2,189,875
PORTABLE BAKING OVEN
Filed April 5, 1937
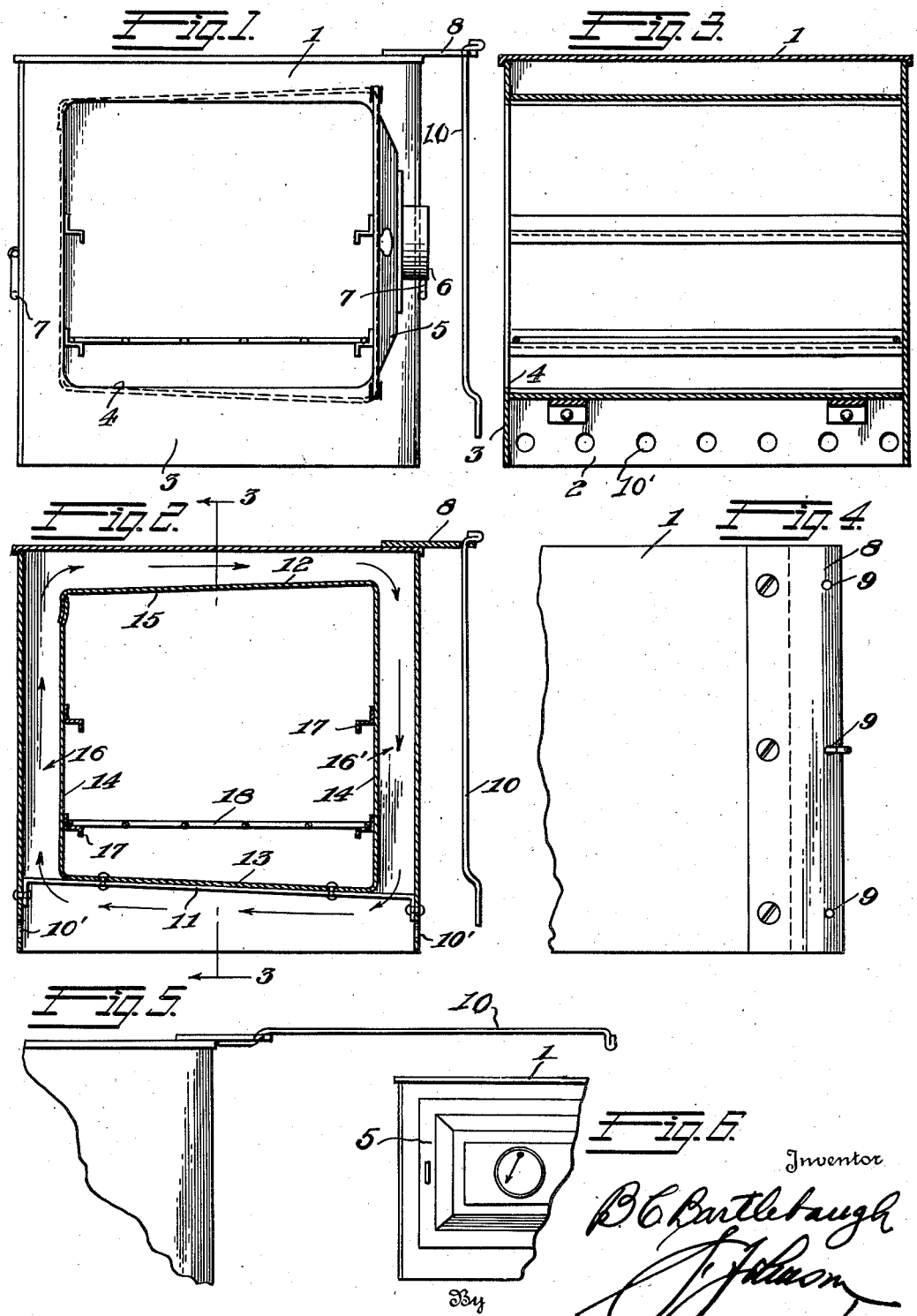

Patented Feb. 13, 1940

2,189,875

UNITED STATES PATENT OFFICE 2,189,875

PORTABLE BAKING OVEN

Benjamin C. Bartlebaugh, Wheeling, W. Va.

Application April 5, 1937, Serial No. 135,189

1 Claim. (Cl. 126—275)

The present invention is directed to improvements in portable baking ovens.

The primary object of the invention is to provide an oven of this character so constructed that the heat will be compelled to circulate freely across the bottom, sides and top wall of the oven proper.

A further object of the invention is to provide the oven proper with inclined bottom and top walls in order that the heat during its circulation will be in no way retarded.

Another object of the invention is to provide an oven wherein the heat will be caused to pass completely around the oven proper in one direction, and during the circulation thereof will be reheated whether the heating medium be gas, electricity or coal, thereby saving fuel consumption.

A still further object is to provide an oven of this kind wherein, when gas is used, the fumes will be consumed and the unburnt gas will be returned as it circulates with the heat to be entirely consumed.

With these and other objects in view, this invention resides in the novel features of construction, formation, combination and arrangement of parts to be hereinafter more fully described, claimed, and illustrated in the accompanying drawing, in which:

Figure 1 is a front view of the oven, the door thereof being in open position.

Figure 2 is a transverse sectional view.

Figure 3 is a sectional view on line 3—3 of Figure 2.

Figure 4 is a fragmentary top plan view.

Figure 5 is a fragmentary front elevation.

Figure 6 is a fragmentary front elevation.

Referring to the drawing, 1 designates the outer casing, the same being formed from suitable sheet metal, and is open at its bottom, as at 2. The front wall 3 of the casing is provided with a door opening 4, which is normally closed by a hingedly mounted door 5, and on which is mounted a thermometer 6 to indicate oven heat, as is customary. The side walls of the casing have pivoted thereto handles 7 in order that the oven may be conveniently moved when desired.

Fixed to the top wall of the casing 1 is a plate 8 of such width that a part thereof extends beyond the adjacent side wall of the casing, and the extended part thereof is provided with a plurality of openings 9 in which are slidably mounted racks or bars 10, which when moved to horizontal positions serve to support small articles of clothing to be dried.

The outer casing 1 is substantially air tight with the exception of the fresh air openings 10' formed in the side walls thereof and near the lower edges.

A pair of sheet metal bars 11 are provided and have their opposite ends suitably fixed to the side wall of the casing 1 in different planes in order that the bars will be sustained in inclined positions, the purpose of which will appear later.

The oven proper 12 which is confined within the casing 1 comprises a bottom 13, side walls 14 and top 15, said bottom being riveted or otherwise suitably secured to the bars 11. The side walls 14 of the oven 12 are spaced from the side walls of the casing 1 in order that heat conducting conduits 16—16' are provided on opposite sides of the oven 12.

It will be observed that the front and rear edges of the oven proper abut the front and rear walls of the casing 1, thereby making the oven proper 12 air and heat tight in order that a minimum amount of heat is required to heat the oven.

Fixed to the inner faces of the side walls 14 of the oven 12 are guides 17 on which are supported racks 18 for supporting the cooking utensils, as is customary.

Since the bottom wall 13 of the oven is inclined upwardly the heat directed thereagainst will be deflected into the conduit 16 and passes upwardly therein and across the top wall 15 and then enters the conduit 16', doing which a suction is created in order that the heated air will be compelled to travel rapidly in a circuitous path, and will be reheated as it passes over the burner. In case the fuel is gas any unburnt gas will be positively consumed during circulation of the heated air.

What is claimed is:

A portable oven comprising a casing, an oven proper mounted therein and having its respective ends abutting the front and rear walls of the casing and having its side walls spaced from the side walls of the casing to provide vertical side conduits, the top wall of the oven proper inclining upwardly and forming in conjunction with the top wall of the casing a top conduit having a restricted discharge passage formed at the highest point of its inclination opening into the upper end of the adjacent side conduit, the bottom wall of the oven proper being inclined upwardly and in a direction reversely to the inclination of the top wall of the oven proper, said casing having an open bottom for disposition over a heating unit, whereby air in the open bottom will be heated by the heating unit and deflected by the bottom wall of the oven proper into one side conduit and will pass therefrom to the top conduit, and thence from the restricted passage into the other side conduit to be reheated during its travel beneath the bottom wall of the oven proper.

BENJAMIN C. BARTLEBAUGH.